United States Patent
Hurlburt

(10) Patent No.: US 9,581,084 B2
(45) Date of Patent: *Feb. 28, 2017

(54) SYSTEM AND METHOD FOR PREVENTING OBJECTS FROM ENTERING THE INTAKE OF A JET ENGINE

(71) Applicant: Thomas Lucian Hurlburt, Garland, TX (US)

(72) Inventor: Thomas Lucian Hurlburt, Garland, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 14/847,709

(22) Filed: Sep. 8, 2015

(65) Prior Publication Data
US 2015/0377131 A1    Dec. 31, 2015

Related U.S. Application Data

(63) Continuation-in-part of application No. 13/071,213, filed on Mar. 24, 2011, now Pat. No. 9,156,561.

(60) Provisional application No. 61/317,122, filed on Mar. 24, 2010.

(51) Int. Cl.
| | |
|---|---|
| *F02C 7/055* | (2006.01) |
| *F02C 7/047* | (2006.01) |
| *B64D 33/02* | (2006.01) |

(52) U.S. Cl.
CPC .......... *F02C 7/055* (2013.01); *B64D 33/02* (2013.01); *F02C 7/047* (2013.01); *B64D 2033/022* (2013.01); *B64D 2033/0286* (2013.01); *F05D 2220/323* (2013.01); *F05D 2260/80* (2013.01)

(58) Field of Classification Search
CPC .......... B64D 33/02; B64D 2033/022; B64D 2033/0233

USPC ........ 702/187–189; 244/53 B, 134 B, 134 D, 244/134 R

See application file for complete search history.

(56) References Cited

U.S. PATENT DOCUMENTS

| | | | |
|---|---|---|---|
| 2,474,258 A | 6/1949 | Kroon | |
| 2,507,018 A | 5/1950 | Jewett | |
| 3,121,545 A | 2/1964 | Meletiou | |
| 3,867,813 A | 2/1975 | Leibach | |
| 4,092,537 A | 5/1978 | Stewart | |
| 6,089,824 A | 7/2000 | Soares | |
| 7,803,204 B1 | 9/2010 | Mladinich | |
| 7,871,455 B1 | 1/2011 | Sands et al. | |
| 2002/0047070 A1* | 4/2002 | Breer | F02C 7/047 |
| | | | 244/134 R |
| 2003/0105544 A1 | 6/2003 | Kauffman et al. | |
| 2008/0078879 A1 | 4/2008 | Weaver | |
| 2010/0284791 A1 | 11/2010 | Flores | |
| 2011/0095912 A1 | 4/2011 | Sands et al. | |

OTHER PUBLICATIONS

Unknown, "Aircraft Icing", 2008, AOPA Air Safety Foundation, Weather No. 1, pp. 1-16.*

* cited by examiner

*Primary Examiner* — Mischita Henson
(74) *Attorney, Agent, or Firm* — St Onge Steward Johnston and Reens LLC

(57) ABSTRACT

A system for preventing objects from entering the intake of a jet engine including a deflector mounted to the turbine shaft and including a de-icing device to minimize collection of ice on the deflector. The deflector includes a sensor in one embodiment for measuring object strikes so that comprehensive impact data may be obtained to generate an impact report so that measures can be taken to minimize object impacts.

24 Claims, 4 Drawing Sheets

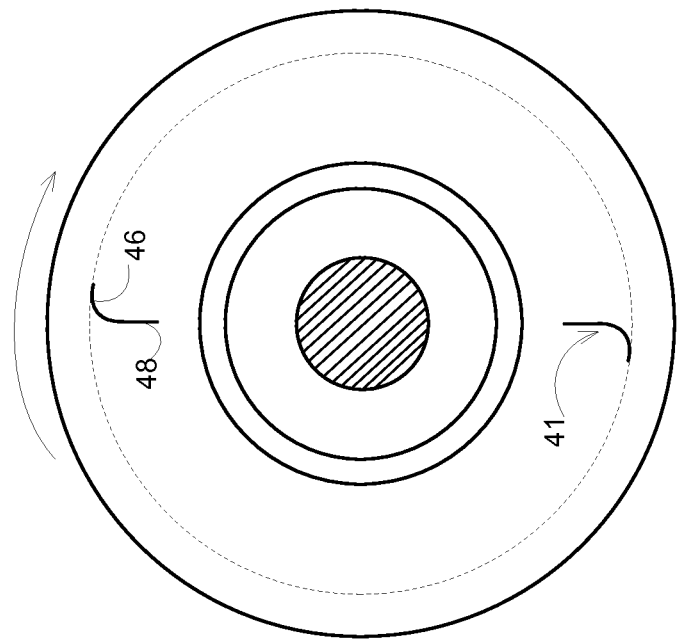
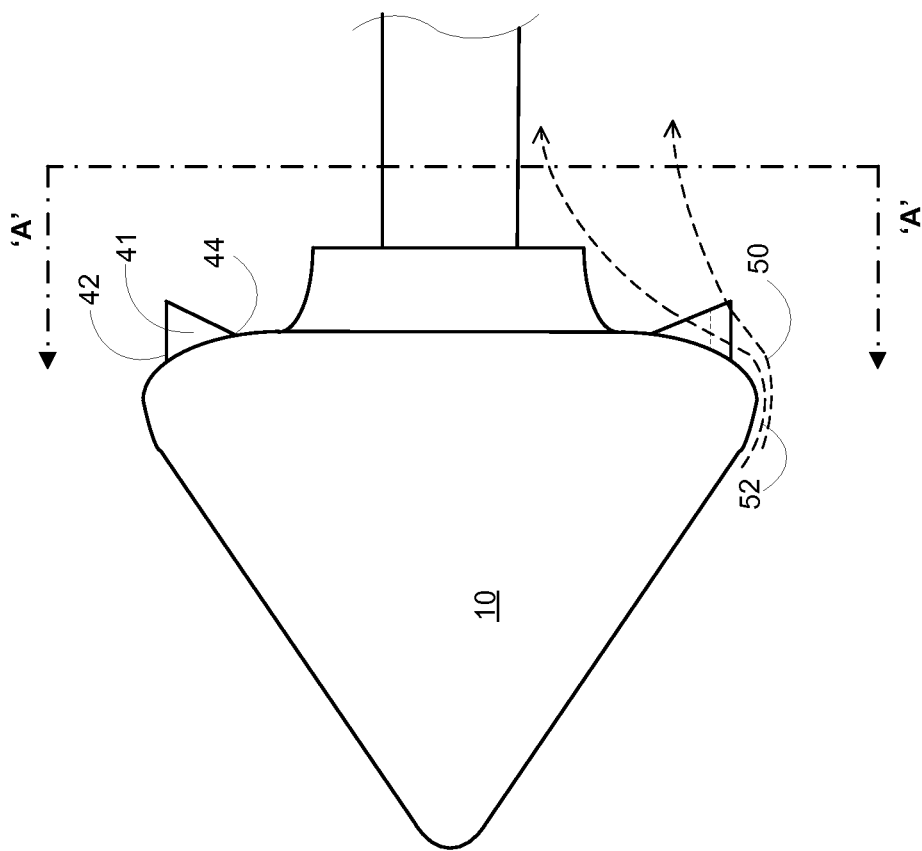
FIGURE 5
FIGURE 4

SYSTEM AND METHOD FOR PREVENTING OBJECTS FROM ENTERING THE INTAKE OF A JET ENGINE

FIELD OF THE INVENTION

The invention relates to the field of jet aircraft engines, and more specifically, to a system and method for preventing objects (e.g. hailstones, birds, etc.) from entering the air intake of a jet engine.

BACKGROUND OF THE INVENTION

Commercial and military aircraft have used jet engines as propulsion means for many decades. Jet engines are typically mounted on the either the wings and/or the fuselage of the aircraft.

A jet engine typically includes a metal housing (usually cylindrical in shape) having an opening at a front end in which air enters the engine and a narrowed rear portion relative to the front opening, from which the air exits the engine. A turbine is typically provided inside of the housing that rotates on a shaft so as to pull air into the air intake. The pulling of air into the intake and expulsion of the air from the rear portion of the jet engine creates thrust for propelling the airplane forward.

Maintaining thrust is critical for a pilot to maintain control of the jet aircraft. If thrust is lost due to, for example, engine failure, the pilot will have great difficulty in maintaining the aircraft aloft indefinitely. While many jet aircraft comprise multiple jet engines, even the failure of a single engine can pose a very serious safety hazard to the aircraft, individuals on the aircraft and to individuals and property on the ground if the aircraft is forced to make an emergency landing due to the failure of the jet engine.

As jet engine failure may have such dire consequences, companies and organizations that run them typically go to great lengths to maintain the engines in top operating condition. However, there are a number of problems that cannot be avoided by simple maintenance. For example, as jet engines have an air intake at a front end of the housing, objects (e.g., large hailstones, birds, etc.) may inadvertently be drawn into the air intake. If the objects are of sufficient size, it is possible that the object could damage the turbine, reducing the efficiency of the engine or even cause catastrophic failure of the engine altogether.

Measures have been taken to limit these problems. For example, direction is given to pilots relating to severe weather so as to allow aircraft to avoid flying through areas where large hailstones could be falling or preventing aircraft from landing or taking off in areas of severe weather. Likewise, measures have been taken to limit the number of birds that may be in and around airports. However, while these measures have no doubt reduced the number of strikes against jet engines, they can do nothing to protect a jet engine from a strike in the event the plane finds itself in a severe storm or in the vicinity of a flock of birds.

Systems have attempted to deal with the problem with limited success. For example, U.S. Pat. No. 7,871,455 entitled "Jet Engine Protection System" discloses that a screen may be positioned over the opening of the jet engine intake or alternatively, an inflatable bag may be inflated in front of the air intake to deflect incoming objects. However, some problems this system faces is that, the screen may become cluttered with objects (e.g., multiple bird strikes) thereby limiting air intake or if an object strikes the bag, the bag is no longer useful. Additionally, neither the bag nor the screen may be de-iced, which could cause the problem of large amounts of ice building up on the structure in front of the intake that could detach and potentially enter the intake.

Accordingly, it would be advantageous to provide a system and method that prevents or minimizes the ability of objects (e.g., hailstones, birds, etc.) from entering the air intake of a jet engine.

It would also be advantageous to provide a system and method that would provide for de-icing of the structure that would prevent or minimize the ability of objects from entering the air intake of a jet engine.

SUMMARY OF THE INVENTION

These and other objects are achieved in one advantageous embodiment of the invention by the provision of a deflector that may be placed ahead of the air intake of a jet engine.

It is contemplated that the deflector may be provided as a cone-shaped structure with the narrowed end facing forward and the wider end positioned closer to the air intake of the jet engine. While the deflector is described and illustrated in a shape of a cone, it is contemplated that other shapes may be effectively utilized. For example, the deflector may be provided frusto-conical, or the narrowed end may be provided as a rounded front end portion. Likewise, the tapered body of the deflector may be provided as a curved body. Accordingly, many differing body configurations may be effectively used depending upon the specific jet engine, the amount of thrust the engine creates and the use to which the aircraft is to be put.

It is contemplated that the deflector may be mounted on the turbine shaft, which may extend outward ahead of the air intake of the jet engine. In one advantageous embodiment, the deflector comprises a composite (e.g. carbon spun fibers and the like) so as to be sufficiently strong to withstand impacts of solid objects at relatively high speeds.

The diameter of the narrowed front end of the deflector may be selected based on the design parameters of the jet engine to which it is to be attached. However, it is contemplated that the diameter of the wider rearward portion of the deflector will be selected to be equal to or greater than the inside diameter of the front end air intake of the jet engine housing. For example, jet engines typically are provided with a housing that includes a rounded front edge into which air is drawn. The wider rear portion of the deflector can be selected to be equal to or greater than a mid-point of the rounded front edge of the housing. In this manner, objects that may have entered the air intake of the jet engine will, instead, strike the outer surface of the deflector and be deflected away from the air intake, preventing the object from entering and/or damaging the turbine. Additionally, the deflector can be positioned ahead of the intake at a distance to be determined based upon the engine specifications and the aircraft. For example, the distance from the wider rear portion of the deflector can be positioned closer to the intake for aircraft that fly at a slower speed. Likewise, the configuration of the deflector, (e.g., the length, width and specific shape) can be selected based on the type of engine, the speed and construction of the aircraft, and the use to which the aircraft is put. For example, an engine with a lower thrust may utilize a deflector that is shorter in length than for an engine with greater thrust. Alternatively, for an aircraft that travels at a higher rate of speed, it may be advantageous to provide a deflector that is greater in length than for slower aircraft.

In one advantageous embodiment it is contemplated that the deflector may be provided with a heater (e.g., electric and/or hot oil feed out to the deflector to prevent the build-up of ice on the deflector). For example, a reservoir (separate from the engine oil reservoir) may be provided to supply heated oil through the shaft out to the body. The shaft may be provided as a hollowed shaft including conduits for transmission of heated fluid to and from the deflector body. While the use of heated oil is discussed here, it is contemplated that virtually any type of heated fluid may effectively be used to de-ice the deflector body. Alternatively, electric heaters, such as are used to de-ice the wings of airplanes, may effectively be used. It is still further contemplated that the deflector cone may be constructed of a material that provides an extremely smooth surface, thereby substantially inhibiting the ability of ice to build up on the deflector. Still further, the deflector may be coated with a material to provide an extremely smooth surface to inhibit potential ice buildup.

For this application the following terms and definitions shall apply:

The terms "first" and "second" are used to distinguish one element, object or thing from another, and are not used to designate relative position or arrangement in time.

The term "data" as used herein means any indicia, signals, marks, symbols, domains, symbol sets, representations, and any other physical form or forms representing information, whether permanent or temporary, whether visible, audible, acoustic, electric, magnetic, electromagnetic or otherwise manifested. The term "data" as used to represent predetermined information in one physical form shall be deemed to encompass any and all representations of the same predetermined information in a different physical form or forms.

The term "network" as used herein includes both networks and internetworks of all kinds, including the Internet, and is not limited to any particular network or inter-network.

The terms "coupled", "coupled to", "coupled with", "connected", "connected to", and "connected with" as used herein each mean a relationship between or among two or more devices, apparatus, files, programs, media, components, networks, systems, subsystems, and/or means, constituting any one or more of (a) a connection, whether direct or through one or more other devices, apparatus, files, programs, media, components, networks, systems, subsystems, or means, (b) a communications relationship, whether direct or through one or more other devices, apparatus, files, programs, media, components, networks, systems, subsystems, or means, and/or (c) a functional relationship in which the operation of any one or more devices, apparatus, files, programs, media, components, networks, systems, subsystems, or means depends, in whole or in part, on the operation of any one or more others thereof.

In one advantageous embodiment a system for deflecting objects from the intake of an airplane engine is provided comprising a deflector, mounted on a shaft coupled to an engine turbine shaft, where the deflector has a rear portion facing an intake of the engine and a front portion extending substantially opposite to the rear portion and the front portion is smaller in diameter than the rear portion. The system further comprises a de-icing device positioned in or on said deflector to inhibit the buildup of ice on said deflector.

Other objects of the invention and its particular features and advantages will become more apparent from consideration of the following drawings and accompanying detailed description.

BRIEF DESCRIPTION OF THE DRAWINGS

FIG. 4 is an illustration of another advantageous embodiment according to FIG. 1.

FIG. 5 is a cross section along section line A-A of FIG. 4.

DETAILED DESCRIPTION OF THE INVENTION

Figure 1:
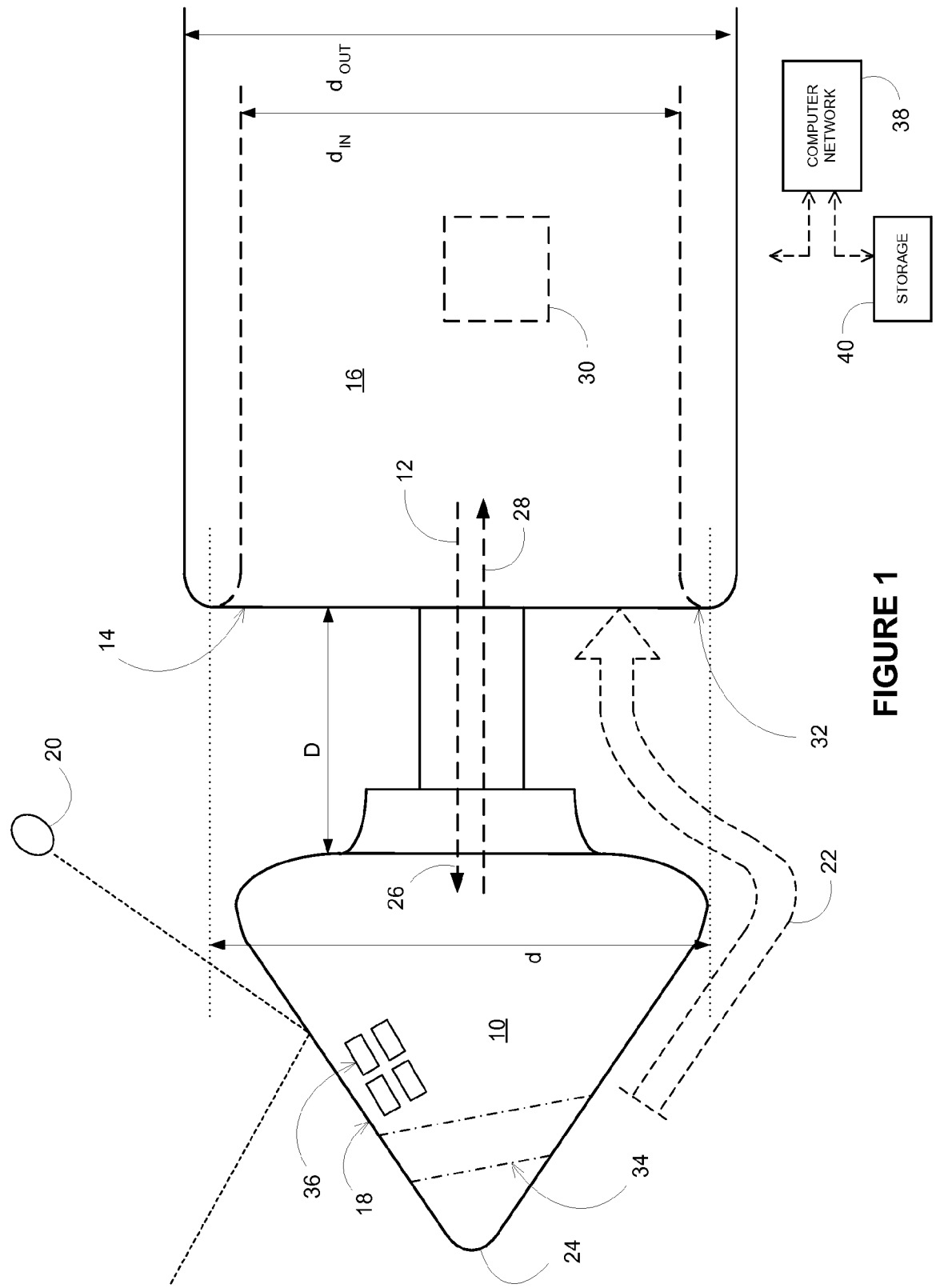
FIG. 1 is an illustration of one advantageous embodiment of the present invention.

Referring now to the drawings, wherein like reference numerals designate corresponding structure throughout the views.

Figure 2:
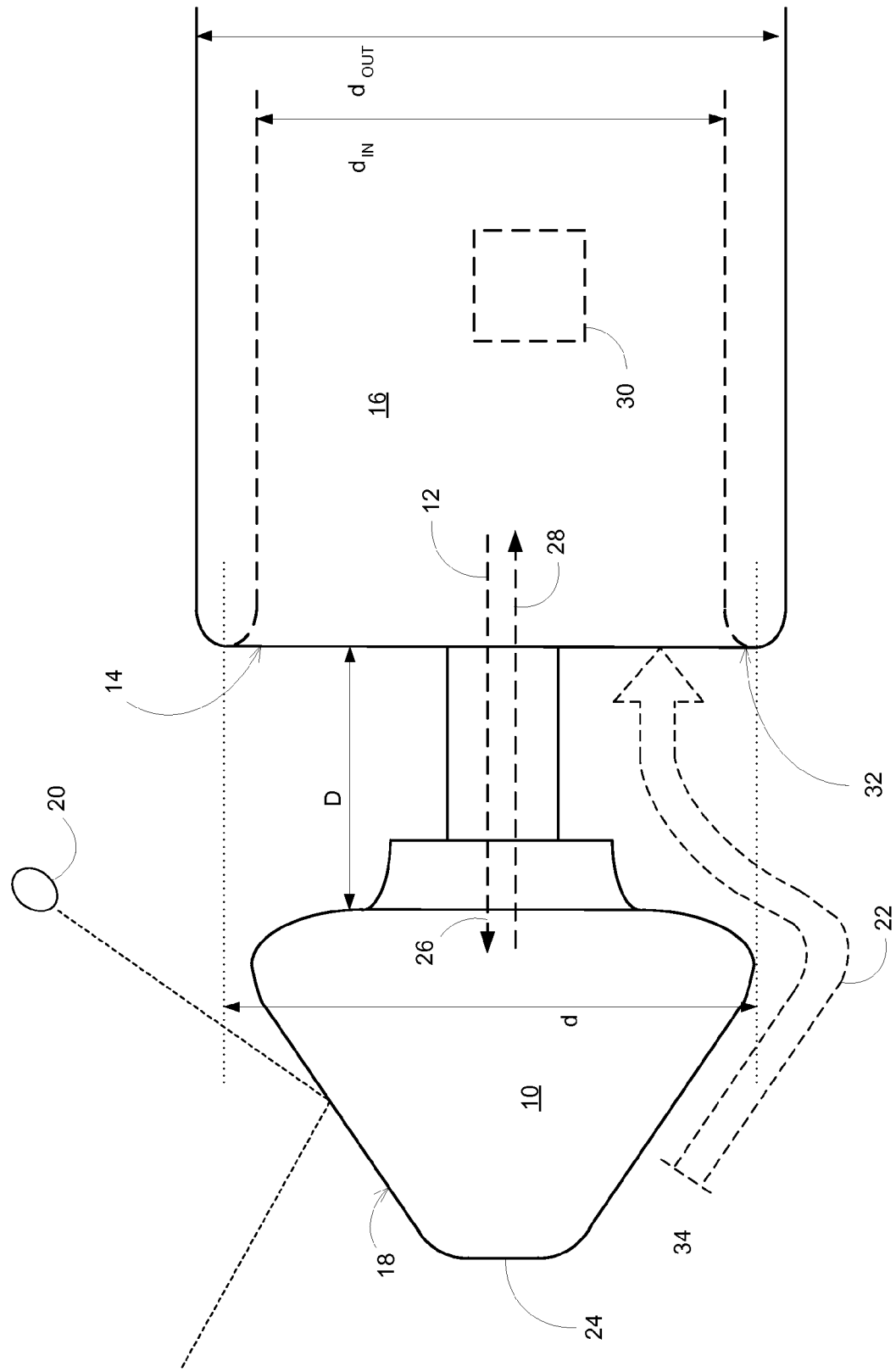
FIG. 2 is an illustration of an advantageous embodiment according to FIG. 1.
Figure 3:
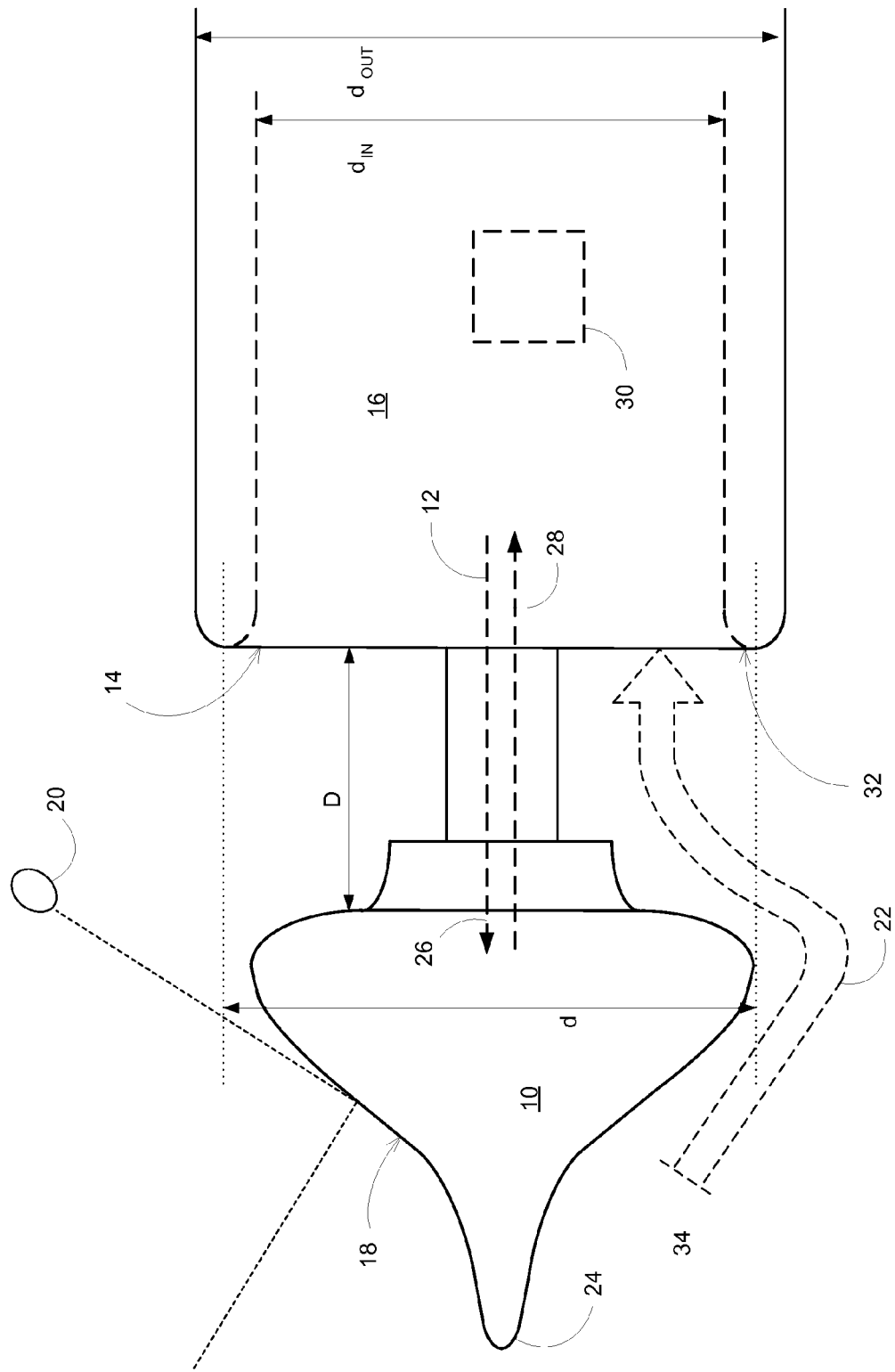
FIG. 3 is an illustration of another advantageous embodiment according to FIG. 1.

Referring now to FIGS. 1-3, a deflector (deflection cone) 10 is illustrated attached to a shaft 12 that extends from a front air intake 14 of a jet engine 16. The deflector 10 is provided in this illustration having a conical shape with an outer surface 18.

As illustrated, the deflector 10 is provided such that if an object 20 (e.g., a large hailstone, bird, etc.) were positioned into the flight path of the airplane, the object would impact the outer surface 18 of the deflector 10 rather than entering the air intake 14 to potentially damage the turbine (not shown) positioned within jet engine 16.

Air flow 22 is illustrated as a dashed line extending from the front end 24 of the deflector 10 and moving around and into the air intake 14 of jet engine 16. While deflector 10 is illustrated having a generally conical shape, it is contemplated that the shape may be adjusted depending upon the performance and requirements of jet engine 16. For example, the deflector could be provided with an elongated body, or with concave or convex outer surfaces 18. Additionally, the front end 24 may be provided with a more rounded or blunt shape. All of these variously may be advantageously selected accordingly to the performance requirements of the engine.

Also depicted in FIG. 1 is dashed line 26 illustrating the flow of heated fluid from jet engine 16 to deflector 10 and dashed line 28 illustrating the return flow of the heated fluid. Fluid reservoir 30 is shown as a dashed line box to the right of the figure. It is contemplated that fluid reservoir 30 may comprise a separate reservoir from the oil reservoir used for the jet engine 16. In this manner, the flow of heated fluid will prevent icing of deflector 10.

Alternatively, dashed line 26 may illustrate an electrical line providing electrical power and/or control to heaters 34 positioned in deflector 10. Dashed line 28 may comprise an electrical line from deflector 10 providing feedback, data collection and control information and/or data transmitted to the airplane control and data connection system. It is contemplated that the electric heaters may comprise virtually any type of heater, including for example, but not limited to resistive or inductive heaters. The heaters may be provided to transmit feedback data as to whether the heaters are properly functioning. The heaters 34 may be provided such that they are positioned to extend circumferentially around the deflector 10.'

Alternatively, the deflector 10 may be constructed of a material providing an extremely smooth surface, substantially inhibiting the ability of ice to build up on deflector 10. Still further, deflector 10 may be coated with a material to provide an extremely smooth surface to inhibit potential ice buildup. In some embodiments, the deflector 10 is made of the same material (e.g., same composite or metal) as the turbine blades of the engine. In this case, the outer surface of the deflector 10 would be made of the same material as the turbine blades of the engine. It is also contemplated that the deflector 10 is made of a mixture of materials such that the outer surface is the same material as the turbine blades of the engine as a skin bonded to an inner structure of the deflector 10, where the inner structure is a different material than the turbine blades, for example, a metal or composite.

Still further, sensors 36 (in FIG. 1 four sensors are depicted) may be positioned in the deflector (e.g. circumferentially or otherwise) to measure and record impacts. For example, sensors 36 measuring the impacts may measure the intensity of an impact and the frequency of impacts, which could then be transmitted to the data collection and control system for the airplane. Still further sensors 36 for measuring virtually any type of measurement on the deflector can be provided including, but not limited to, temperature, strain, deflection/deformation, pressure, and so on and may be positioned in deflector 10 as desired.

All of this information can be transmitted to a computer 38 (coupled to a network), which may or may not be onboard the plane. As depicted in FIG. 1, computer 38 may have a storage 40 accessible by the computer 38 where data relating to impacts against the deflector 10 may be stored. It is contemplated that the data relating to impacts (measured impact data) may be associated by the computer 38 with other data including: the altitude of the airplane at the time of strike, the time of day at the time of strike, the speed of the airplane at the time of the strike, the geographic location of the airplane at the time of the strike (e.g., GPS location), the season (e.g., time of year/date) at the time of the strike and so on, to generate comprehensive impact data. The comprehensive impact data from multiple different airplanes may then be compiled by the computer 38 into an impact report. This impact report can advantageously be used to determine where and when object strikes most commonly occur. This valuable information can then be used to determine if adjustments need be made by, for example, an airport due to an unusually high number of strikes (e.g., adjust the method in which birds are removed from the area, adjust the landing/taking off patterns, adjust bird removal methods depending on the time of year, etc.).

It is contemplated that the diameter (d) of the rear portion of deflector 10 will be equal to or greater than a leading edge 32 of air intake 14. Also illustrated are an inside diameter ($d_{IN}$) and an outside diameter ($d_{OUT}$) of the housing of jet engine 16. It is understood that the diameter, like the shape of the outer surface 18, may be adjusted based upon the performance requirements of jet engine 16.

Still further, the distance (D) from the rear portion of deflector 10 to the leading edge 32 of air intake 14 may be adjusted based upon the performance requirements of jet engine 16. However, the distance (D) will be selected to avoid any negative impact on the thrust of jet engine 16. While the rear portion is provided with a relatively steep slope (as opposed to outer surface 18), it is understood that a more gradual slope can be provided depending upon the application (e.g., sub-sonic or super-sonic flight).

Alternatively, differing configurations for the front end 24 of the deflector 10 may be used as shown in FIG. 2 (frusto-conical) and FIG. 3 (tapered). It is understood that the precise shape can be selected based on the use the aircraft, the thrust of the engine and the speed of the aircraft.

Referring to FIG. 4, deflector 10 is shown with air induction blades 41 extending from the rear of the deflector and towards the intake 14 of the engine. The blades 41 may taper from the leading edge 42 to the trailing edge 44 thereof. The blades 41 are further depicted in FIG. 5 and may include a curved section 46 and a straight section 48. It is contemplated that other blade shapes may be used. The taper of the blades can assist in directing airflow towards the center of the engine. For example the taper of the blades 41 directs an air stream running closer to the deflector along flow line 52 towards the center of the engine and the air stream running farther than the deflector towards the outside of the engine. The taper and shape of the blades 41 can be adjusted to provide a more even air flow into the engine. In other scenarios, the shape of the blades may deflect more air towards the outside of the engine's fan blades than the inside. This may be desirable because the fan blades are moving the fastest at their outward most point and increased airflow at the fastest point can increase compression in the engine and therefore increase efficiency. For example, typically the blades at the first stage of the engine are maintained at a speed as close as possible to the speed of sound because passing the sound barrier on the engine can result in unpredictable flows and undesired forces. By throwing more air into the outer edge of the fan blades using blades 41, it is possible the increase compression of the engine without increasing the speed of the fan blades beyond the speed of sound. One additional advantage is that deflection of more air towards the outside of the engine's blades could keep ash away from the bearings and seals of the engine if the plane were flying through an area with volcanic activity, dust or other airborne debris. This may allow the engine to last longer before a shutdown.

As discussed above, these blades 41 enhance airflow into the engine due to rotation of the deflector 10. Although FIGS. 4-5 show two (2) blades 41, it is contemplated that additional blades may be used. For example, there may be anywhere from 2-100 or more blades and the blades may vary in size and shape. These blades 41 may be made of a composite material, for example a composite including carbon spun fiber. The blades 41 may be made of the same material as the deflector 10 or alternately a different material. The deflector 10 and blades 41 may also be made of a metallic material. In some cases, the deflector 10 and/or the blades may be made of the same material (e.g., same composite or metal) as the turbine blades of the engine.

The blades 41 may also be aligned in different ways than shown. For example, the straight portion is shown aligning with the center of the shaft (aligning along a radius extending from the center of the shaft). The straight portion may extend at an angle relative to the radius. It is also contemplated that the leading 42 and/or trailing 44 edges of the blade can align with this radial direction. In some embodiments, the straight portion 48 is parallel and spaced apart from the radius and the leading edge 42 may align with the radius. The blades 41 may also be evenly spaced around the rear of the deflector such that the deflector 10 is balanced in rotation.

The blades 41 may be made of the same material as the turbine blades of the engine.

Although the invention has been described with reference to a particular arrangement of parts, features and the like, these are not intended to exhaust all possible arrangements or features, and indeed many other modifications and variations will be ascertainable to those of skill in the art.

What is claimed is:

1. A system for deflecting objects from the intake of an airplane engine comprising:
   a deflector, mounted on a shaft coupled to an engine turbine shaft;
   said deflector having a rear portion facing an intake of the engine and a front portion extending substantially opposite to the rear portion, the rear portion positioned at a distance (D) from the intake of the engine to form the sole air intake space between the rear portion and the intake of the engine;

said front portion being smaller in diameter than the rear portion.

2. The system according to claim 1 further comprising a de-icing device selected from the group consisting of: a heated fluid, an electric heater, a coating adhered to an outer surface of said deflector and combinations thereof.

3. The system according to claim 2 further comprising a feedback device positioned in said deflector to provide feedback data relating to said de-icing device when said de-icing device comprises an electric heater.

4. The system according to claim 1 wherein said deflector comprises a carbon spun fiber material.

5. The system according to claim 1 further comprising a sensor located in said deflector for collecting data.

6. The system according to claim 5 wherein the data collected by said sensor is transmitted to a computer on the airplane and stored in a storage accessible by said computer.

7. The system according to claim 6 wherein said computer is coupled to a network.

8. The system according to claim 7 wherein said sensor is selected from the group consisting of: a temperature sensor, a pressure sensor, a strain gauge, a deflection/deformation sensor and combinations thereof.

9. The system according to claim 7 wherein said sensor measures the impact of an object against said deflector.

10. The system according to claim 9 further comprising a computer coupled to a network and a storage accessible by said computer, wherein the measured impacts are transmitted to said computer and stored in the storage as measured impact data.

11. The system according to claim 10 wherein said computer associates the measured impact data with additional data selected from the group consisting of:

altitude data, time data, speed data, geographic location data, season data and combinations thereof, to generate comprehensive impact data.

12. The system according to claim 1 wherein said deflector comprises a shape selected from the group consisting of: conical, frusto-conical and tapered.

13. The system according to claim 1 wherein a diameter (d) of the rear portion of said deflector is less than an outer diameter (dout) of the intake of the airplane engine and the diameter (d) of the rear portion is greater than an inner diameter (din) of the intake of the airplane engine.

14. The system according to claim 1 further comprising:

at least one blade extending from the rear portion and towards the intake.

15. The system according to claim 1 wherein the deflector includes a metallic material on its outer surface.

16. The system according to claim 15 wherein the metallic material is the same material as a turbine blade of the engine.

17. A system for deflecting objects from the intake of an airplane engine comprising:

a deflector, having a front portion that is substantially opposite a rear portion;

said rear portion facing an intake of the engine and positioned at a distance (D) from the intake of the engine to form the sole air intake space between the rear portion and the intake of the engine;

said front portion being smaller in diameter than said rear portion;

at least one blade extending from the rear portion and towards the intake.

18. The system according to claim 17 wherein said deflector comprises a shape selected from the group consisting of: conical, frusto-conical and tapered.

19. The system according to claim 17 wherein a diameter (d) of the rear portion of said deflector is less than an outer diameter (dout) of the intake of the airplane engine and the diameter (d) of the rear portion is greater than an inner diameter (din) of the intake of the airplane engine.

20. The system according to claim 17 wherein said deflector comprises a carbon spun fiber material.

21. The system according to claim 17 further comprising a sensor located in said deflector for collecting data.

22. The system according to claim 17 wherein the at least one blade is made of the same material as a turbine blade of the engine.

23. The system according to claim 17 wherein the deflector includes a metallic material on its outer surface.

24. The system according to claim 23 wherein the metallic material is the same material as a turbine blade of the engine.

* * * * *